March 27, 1956  E. F. KLESSIG ET AL  2,739,449
POWER TRANSMISSION FOR MULTIPLE MOTOR OPERATION
Filed Sept. 26, 1952  3 Sheets-Sheet 1

INVENTORS
ERNST F. KLESSIG
GLENN M. JONES
BY
Ralph R. Tweedale
ATTORNEY

March 27, 1956     E. F. KLESSIG ET AL     2,739,449
POWER TRANSMISSION FOR MULTIPLE MOTOR OPERATION
Filed Sept. 26, 1952     3 Sheets-Sheet 3

INVENTORS
ERNST F. KLESSIG
GLENN M. JONES
BY
Ralph L. Tweedale
ATTORNEY

United States Patent Office 2,739,449
Patented Mar. 27, 1956

2,739,449

POWER TRANSMISSION FOR MULTIPLE MOTOR OPERATION

Ernst F. Klessig, Berkley, and Glenn M. Jones, Farmington, Mich., assignors to Vickers Incorporated, Detroit, Mich., a corporation of Michigan Application September 26, 1952, Serial No. 311,588

9 Claims. (Cl. 60—97)

This invention relates to power transmissions, and is particularly applicable to those of the type comprising two or more fluid pressure energy translating devices, one of which may function as a pump and another as a fluid motor.

More specifically, the invention relates to a transmission in which a single source of fluid pressure may be utilized to operate a plurality of fluid motors.

There are many applications in which such transmissions are used, for example, on a grain harvesting machine where one motor operates a speed control mechanism and another controls the height of a header bar carrying the mower blades. It is important that the system have the ability to meet a demand by one motor without diversion of the fluid supply necessary for the second motor. Use of a flow dividing valve provides this ability.

Directional valve means actuated by the harvester operator may be utilized to control operation of the motors. The load against which the motor must work is heavy and when the control valves are moved rapidly, large acceleration forces are involved. Stresses resulting from shock and high pressures thus created are detrimental to both the machine and its hydraulic components.

It is an object of the present invention to provide such a system in which acceleration forces can be controlled regardless of the speed with which the directional valves are manipulated.

Further, when a load is to be actuated and positioned against the force of gravity, as in the case of the header bar, a single-acting cylinder and a lock valve may be used. The lock valve comprises a check valve oriented to block flow from the motor and auxiliary means to open it against pressure in the motor. When such a motor is brought to a stop against the force of gravity by use of the check valve a heavy shock normally results.

A further object of this invention is to provide a lock valve mechanism which affords acceleration control with consequent reduction in shock loading.

Still another object is to provide a system for operation of a single-acting motor equipped with a lock valve which provides automatic acceleration control for that motor both in power starting and in stopping against the force of gravity.

It is often desirable in operation of the header bar of a harvester that the bar be permitted to float uninfluenced by hydraulic pressure. For this reason, the check valve of the lock valve may be maintained open for prolonged periods. If the high pressures necessarily available to initially open the check valve are utilized to hold it open, a large power waste ensues.

It is therefore also an object to provide a lock valve which makes available the high pressures necessary to open the check valve against high cylinder pressures but which unloads the pressure source to power-conserving lower pressures while holding the check valve open.

Another object is to provide a low cost power unit incorporating pumping mechanism and the valves for operation of such a system into a compact integral unit.

Further objects and advantages of the present invention will be apparent from the following description, reference being had to the accompanying drawings wherein a preferred form of the present invention is clearly shown.

Figure 1:
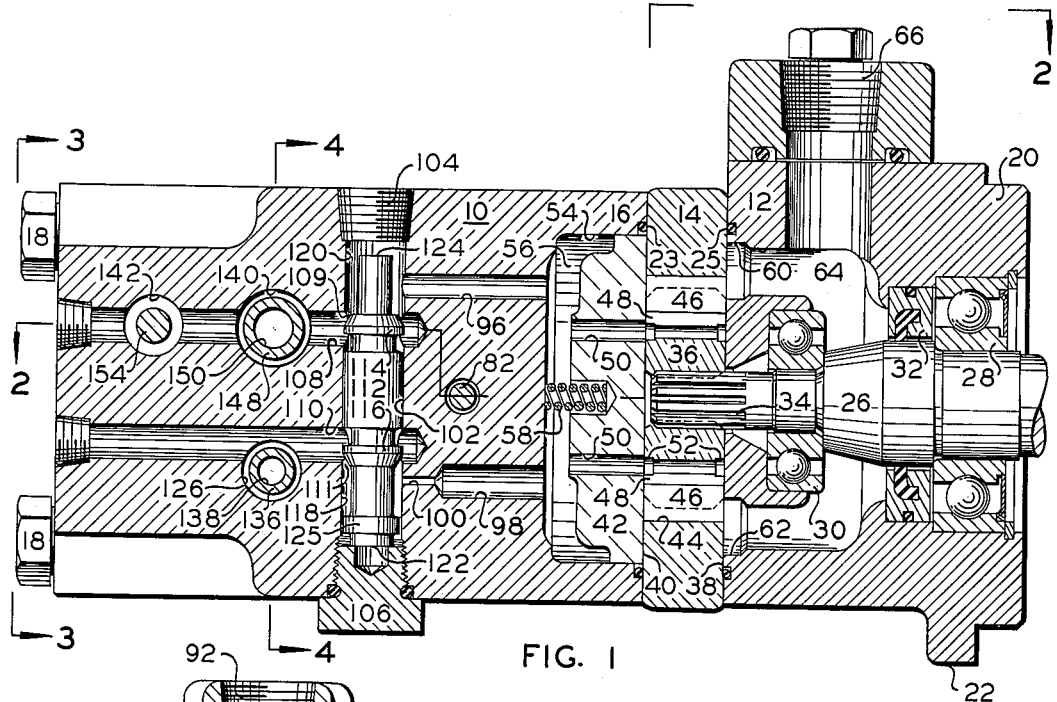
Figure 1 is a sectional view taken on line 1—1 of Figure 2, which shows a preferred form of the present invention.

Referring now to Figure 1 there is shown a pumping unit of the well known radially sliding vane type described in the patent to Duncan B. Gardiner et al., 2,544,988. The pump includes a housing 10 composed of three sections arranged in a sandwich relation. These three sections are a body 12, a ring 14, and a head 16 secured together by a plurality of bolts 18 which extend through the head and ring and engage screw threads in the body 12. The body 12 includes a pilot 20 and a mounting flange 22 having mounting holes 24 therein. O ring seals 23 and 25 insure a fluid tight juncture of the housing head 16 and body 12 with the ring 14.

A drive shaft 26 extends from the body element 12 and is supported therein by bearings 28 and 30. A shaft seal 32 encircles the shaft 26 in the usual manner. The inner end of shaft 26 carries a spline at 34 which engages a mating spline in the rotor 36 of the pumping mechanism. Rotor 36 is mounted between parallel plane surfaces comprising the face 38 of body element 12 and the face 40 of an axially floatable pressure plate 42. A generally elliptical cam contour 44 machined in the ring portion 14 encircles the rotor 36. Vanes 46, slidable in radial slots 48 in rotor 36 are maintained against the cam contour by centrifugal force aided by fluid pressure on the underside of the vanes supplied through passages 50 in the pressure plate 42 and channels 52 in the rotor 36. The requisite inlet porting for the pumping unit is supplied by a pair of kidney ports 60 and 62 in the face 38 of body 12. Ports 60 and 62 are at the termini of a branched passage 64 which communicates with an external inlet connection port 66. Outlet porting from the pumping mechanism is provided by a pair of kidney-shaped ports 68 and 70 extending completely through pressure plate 42 into pressure chamber 56. It can be seen that working pressure of the pump will exist in chamber 56 and will be exerted on pressure plate 42 to aid spring 58 with a force proportional to the pump working pressure. Dowel pins 72 and 74 extend from body 12 through ring 14 and into pressure plate 42 to maintain proper angular alignment of those parts.

As heretofore shown, the pumping mechanism delivers fluid under pressure through ports 68 and 70 to the pressure chamber 56. There are three possible paths of egress from chamber 56. The first of these comprises an axial passage 76 which intersects a stepped transverse bore 78 having a relief valve 80 inserted therein. Valve 80 has a pilot portion 82 which serves the dual function of keeping the valve in alignment with its seat and providing a dashpot action. The dashpot action is obtained by maintaining a relatively close fit between the pilot portion 82 and the reduced portion 84 of the stepped bore 78, thus providing a restricted path to or from the effective area 86 and the end of valve 80. A spring 88 biases the valve 80 against its seat in opposition to fluid pressure on area 86. A manifold cover 90 overlies the outward end of bore 78 to back up the spring 88 and provide fluid communication between bore 78 and an external return connection port 92 in the cover. Outward movement of valve 80 is limited by contact of spring guide 94 with the cover 90.

The other two fluid exits from pressure chamber 56 are the axial passages 96 and 98. Passage 96 is of a relatively large cross-section as compared with a restriction 100 in passage 98, however, the flow restrictive effect of passage 96 relative to restriction 100 is important in establishing the manner of flow division between passages 96 and 98. Passages 96 and 98 intersect a transverse bore 102. Bore 102 is closed at its opposite ends by a pair of plugs 104 and 106 and is intersected by a second pair of passages 108 and 110 staggered relative to the intersection with passages 96 and 98. A flow dividing valve 112 is positioned in the bore 102 and includes a pair of lands 114 and 116. Land 114 controls communication between passage 96 and passage 108 by providing a restriction at 109, and land 116 controls communication between passage 98 and passage 110 by providing a restriction at 111. Valve 112 is axially slidable in bore 102 and it can be seen that movement of the valve inversely affects communication between passage 96 and passage 108 and between passage 98 and passage 110. For example, if valve 112 is moved upward from the position shown in Figure 1, the communication between passages 98 and 110 becomes freer while that between passages 96 and 108 is simultaneously restricted.

Valve 112 is shiftable in response to a pressure differential across its ends, and in shifting it tends to eliminate the movement initiating differential. For example, if the pressure in the lower end 118 of bore 102 exceeds that in the upper end 120 the net force on the lower and upper opposed axially effective areas, indicated at 122 and 124, respectively, is such as to produce upward movement of the valve. Upward movement of valve 112 causes land 114 to constrict communication between passages 96 and 108 while at the same time communication between passages 98 and 110 is made freer. Valve 112 thus tends to maintain equal pressures in the ends 120 and 118 of bore 102. Since each passage 96 and 98 leads from pressure chamber 56 to one end of bore 102, and since the pressure in those ends is kept equal by valve 112, the pressure drop across those two passages is equal. Due to the relative restrictive effects of passage 96 and restriction 100, flow from the pump will be divided between the passages 96 and 98 in approximately the same ratio as that which the areas of those passages bear to each other. For example, if the cross-sectional area of the restriction 100 is one-fifth that of the passage 96, approximately one-sixth part of pump delivery will pass through passage 98, and hence passage 110, and the balance will flow through passage 96 to passage 108. By proper selection of the relative areas, and hence the flow restrictive characteristics, of passages 96 and 98, any desired ratio between the flow rates in those passages can be provided.

Valve spool 112 has thereon a third land 125 which is in close peripheral proximity to bore 118 for the purpose of providing a restricted fluid path from passage 98 to that part of the axially effective area 122 at the end of spool 112. Movement of spool 112 is thus damped for a purpose hereinafter discussed.

Figure 3:
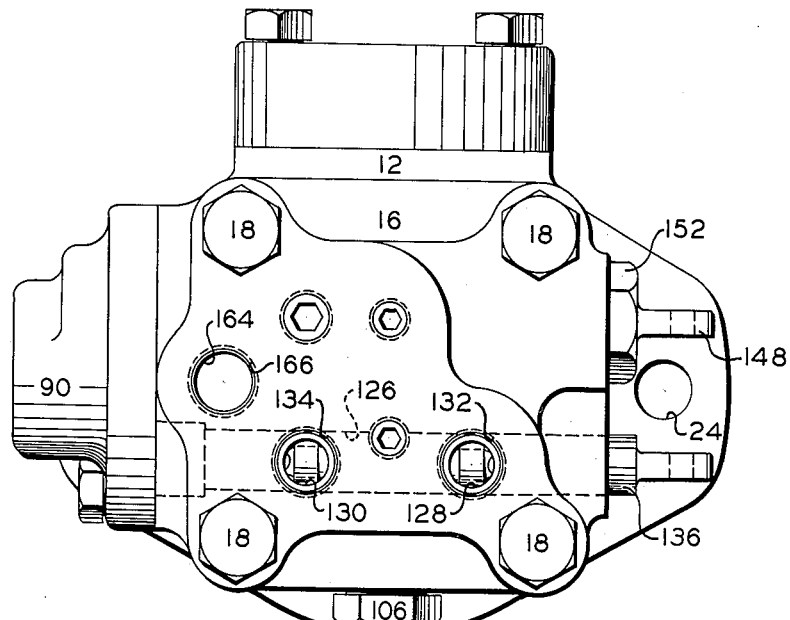
Figure 3 is an end elevation taken on line 3—3 of Figure 1.
Figure 4:
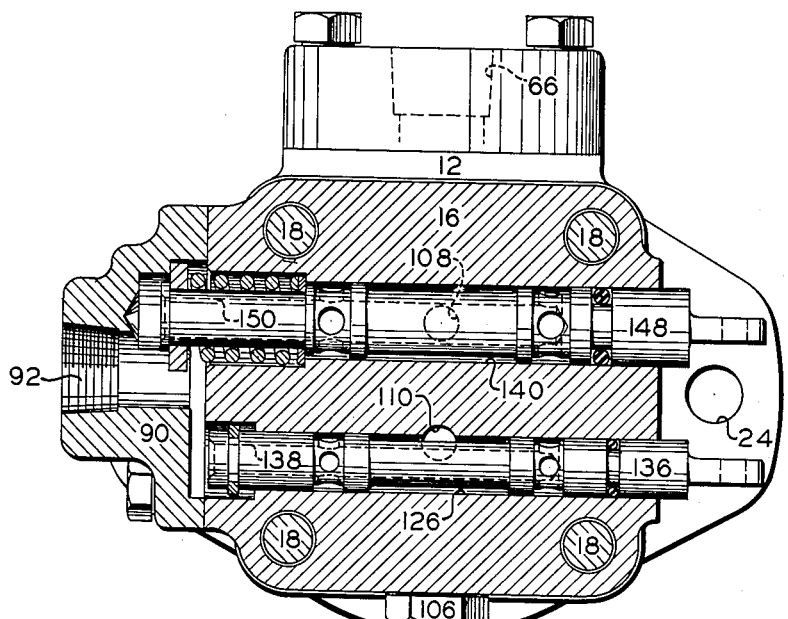
Figure 4 is a sectional view taken on line 4—4 of Figure 1.

Axial passage 110 also intersects a transverse directional valve bore 126 which is perpendicularly offset from bore 102. Bore 126 is also intersected by a pair of motor passages 128 and 130, as can be seen in Figure 3, each equipped with a threaded external connection port 132 and 134, respectively. A spool 136 is slidably positioned in the bore 126 and has a central passage 138 therein which communicates with the return connection port 92 in cover 90. Spool 136 is illustrated in an intermediate "open center" position in which passages 110, 128, and 130 are all vented to tank through passage 138, and from which position it is shiftable to cause an increase in pressure in either passage 128 or 130 to thus operate a double-acting fluid motor connected thereto.

Passage 108 extends from its intersection with bore 102 to intersect a pair of parallel valve bores 140 and 142 which are perpendicularly offset from bore 102. A pair of spaced passages 144 and 146 extend between bores 140 and 142. A valve spool 148 is slidably positioned in the bore 140 and has a central passage 150 therein which communicates with the return port 92 in cover 90. Spool 148 is illustrated in an intermediate "open center" position in which passages 108, 144, and 146 are all vented to tank through passage 150, and from which position it is shiftable to cause an increase in pressure in either passage 114 or 146.

Bore 142 is closed at one end by a plug 152 and has a plunger 154 axially shiftable therein. The other end of bore 142 is closed by a plug 156 which is chambered to receive a valve spring 158 and act as a guide for a ball check valve 160. Ball check 160 coacts with a seat in a centrally perforate bushing 162 to control fluid flow through the bushing. Bore 142 is intersected at 161, between plug 156 and bushing 162, by a motor passage 164 provided with a threaded external connection port 166. It can be seen that the orientation of check valve 160 is such that it allows flow from passage 144 to passage 164 and blocks reversal thereof.

Figure 2:
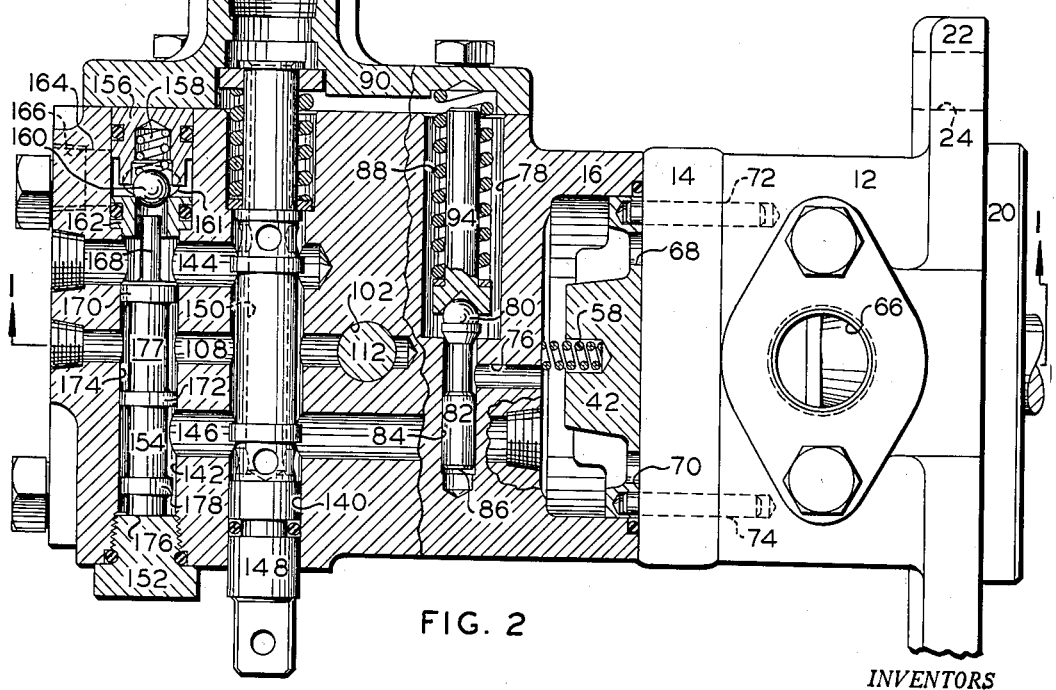
Figure 2 is a partial section taken on line 2—2 of Figure 1.

Plunger 154 includes an axially extending push rod portion 168 which, on upward movement of the plunger, as viewed in Figure 2, is adapted to engage check valve 60 to lift it from its seat to permit reverse flow from passage 164 to passage 144. A pair of spaced lands 170 and 172 on plunger 154 form a cannelure 174 which remains in communication with passage 108 throughout the entire path of travel of the plunger. In the position shown, cannelure 174 is isolated from passage 144, but upon shifting of plunger 154 to a position wherein push rod 168 has contacted and opened check valve 160, communication between passages 108 and 144 is established through cannelure 174. Check valve 160 and plunger 154 together comprise a lock valve, generally designated 177, for controlling communication between passages 144 and 164.

Plunger 154 is shiftable to open valve 160 in response to pressure acting on its axially effective area indicated at 176. The plunger has thereon a third land 178 which is in close peripheral proximity to bore 142 for the purpose of providing a restricted path from passage 146 to that part of the axially effective area 176 at the end of plunger 154. Movement of plunger 154 is thus damped for a purpose hereinafter discussed.

Figure 5:
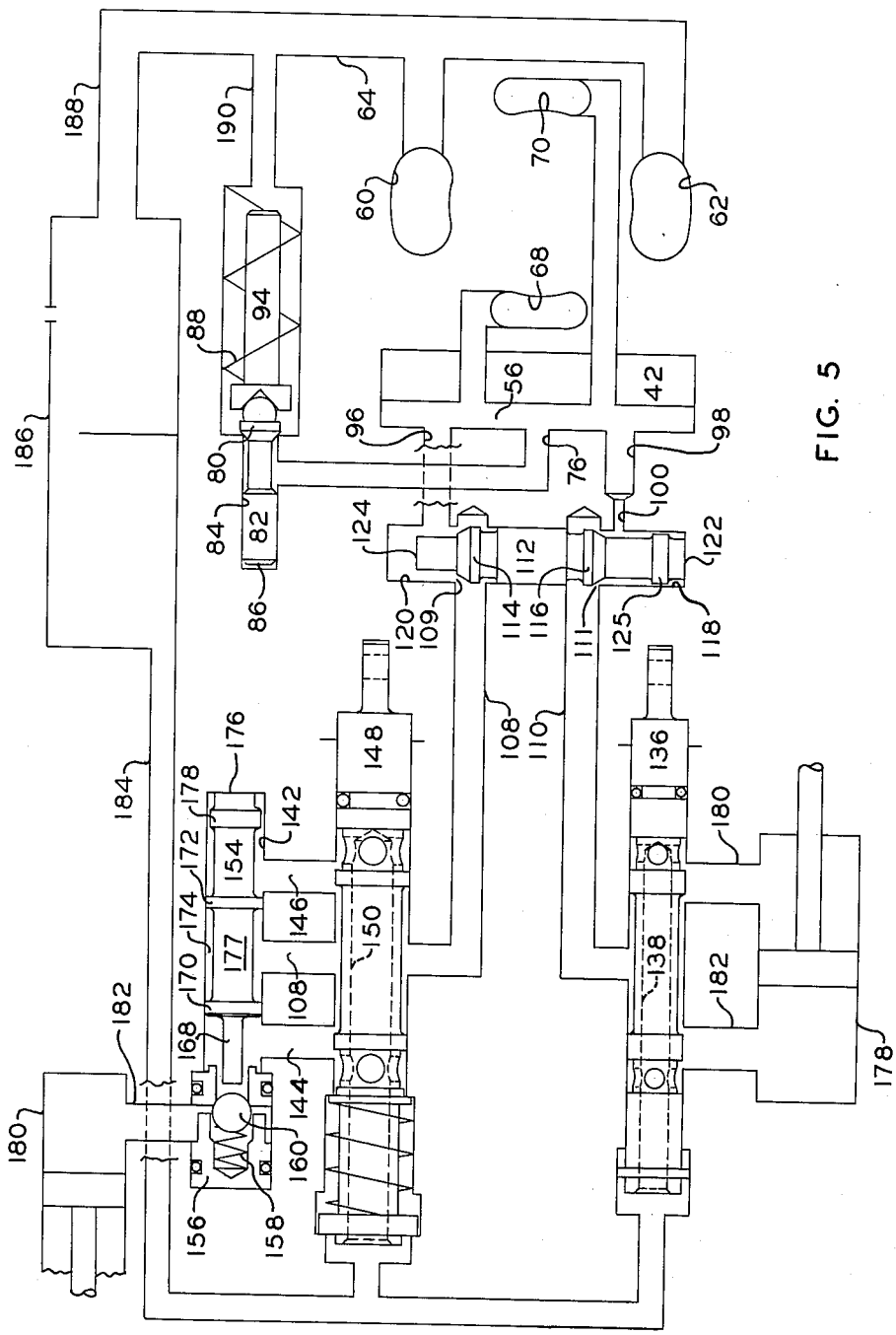
Figure 5 is a schematic diagram of the present invention shown as connected in a typical circuit.

Operation of the unit can best be understood by reference to Figure 5 which is a schematic arrangement of the unit's components as they would be connected in an application such as the harvester heretofore mentioned.

Directional valve 136 is shown connected to a double-acting fluid motor 178 by a pair of conduits 180 and 182. In an actual installation, conduits 180 and 182 would connect the opposed ends of motor 178 to the threaded connection ports 132 and 134 in the head element 16. Motor 178 would then be mechanically connected to a device for controlling the speed of the harvester. Lock valve 177 and directional valve 148 cooperate to control a single-acting motor 180 connected thereto by a single conduit 182. Conduit 182 would connect from motor 180 to the threaded connection port 166, in actual practice. Motor 180 might then be mechanically connected to the harvester header bar so as to raise it against the force of gravity. A conduit 184 provides communication between directional valves 136 and 148 and a fluid reservoir 186. Return conduit 188 leads from tank 186 to the branched passage 64 which leads to the pump inlet zones 60 and 62. In practice, conduits 184 and 188 would respectively connect tank 186 to the external connection ports 92 and 66. For the sake of simplicity of illustration, in Figure 5 relief valve 80 is shown provided with a return conduit 190 connected to branched passage 64. To conform to the preferred embodiment illustrated in Figures 1 through 4, conduit 190 would connect to conduit 184.

In operation, the pumping unit will transfer fluid from inlet ports 60 and 62 to outlet ports 68 and 70 and thence to pressure chamber 56. As heretofore discussed, flow dividing valve 112 is shiftable to relatively proportion flow in passages 108 and 110 by conjointly inversely affecting communication between passage 96 and passage 108 and between passage 98 and passage 110. With valve 136 in the position shown, passage 110 will be vented to tank as will passages 180 and 182 and hence the opposed ends of motor 178. It can be seen that shifting of valve 136 will cause a pressure increase in one of the motor ends thus inducing motor movement.

With valve 148 in the position shown, passages 108, 144, and 146 will be vented to tank. As heretofore stated, motor 180 operates against the force of gravity hence check valve 160 will be seated by pressure in the motor and in passage 182. Assuming valve 148 is moved to the left, as shown in Figure 5, pressure in passage 144 will build up to shift valve 160 against pressure in the motor line 182 thus permitting fluid flow to motor 180 to cause movement thereof. Shifting valve 148 to the right will cause pressure build-up in passage 146 and hence on the effective area 176 of plunger 154, resulting in a leftward shift thereof to open check valve 160 against pressure in motor line 182. Motor 182 is thus vented to tank through passage 144 and will move under the force of gravity. As heretofore mentioned, movement of plunger 154 to open valve 160 also connects cannelure 174 to passage 144. Thus, if valve 148 is maintained in a rightward position, fluid from passage 108 will bleed to tank through cannelure 174 thus reducing pressure in passage 108 to approximate that small value necessary to keep spring 158 compressed. Power waste in maintaining communication between passages 182 and 144 is thus eliminated.

The operator of such a device cannot devote his sole attention to careful manipulation of directional valves 136 and 148. There is often a tendency to "hit" the valves, that is, to operate them abruptly. In such a case pressure is suddenly applied to motor 178, or 180, as the case may be, resulting in high pressure surges in the system and detrimentally large acceleration forces. The present invention proposes to eliminate this problem by provision of damping land 125 on flow dividing valve 112. Assume that both valves 136 and 148 are in the position shown with dividing valve 112 so positioned as to properly proportion flow between passages 108 and 110. Assume now that the operator "hits" valve 136 to operate motor 178 against its load. The sudden resistance to flow in line 110 thus created results in a disportionate part of the pump delivery being diverted into the path of least resistance, that is, across the restriction 109 and through open-center valve 148. Increased flow through passage 96 results in a pressure differential such as to induce upward movement of valve 112 and increased restriction at 109 as heretofore described. However, damping land 125 so restricts flow of fluid to the end 122 of valve 112 that the valve moves at a determinable slow rate to increase resistance to flow at 109. The gradual decrease in flow thus produced at restriction 109 results in a corresponding gradual increase in flow across restriction 111 and hence to motor 178. Motor 178 is thus smoothly accelerated even though directional valve 136 is abruptly actuated. Increasing the flow resistance produced by land 125 will decrease acceleration forces in the system and decreasing that resistance will permit more rapid acceleration of motor 178.

Analogous acceleration control of motor 180 results upon actuation of valve 148 to apply pressure thereto. The initial fluid diversion and gradually increasing resistance thereto occurs at restriction 111.

In lowering motor 180, plunger 154 is actuated by pressure ported thereto by valve 148 to open the check valve 160. Upon opening of check valve 160, motor 180 will drop under the influence of gravity until valve 160 is permitted to close. Abrupt closure of valve 160 would result in a severe shock and possible damage to the mechanism. Plunger 154 is therefore equipped with damping land 178 which controls the rate of egress of fluid from the end of bore 142 adjacent the effective area 176 and thus controls the speed of movement of the plunger and hence the closing speed of valve 160. By this means, the rate at which flow from motor 180 is cut off may be controlled and hence the deceleration rate of motor 180 is kept within desired limits.

There has thus been provided a system for actuation of a pair of fluid motors from a single source of pressure in which acceleration forces can be controlled regardless of abruptness of movement of the directional valves.

There has also been provided in such a system a lock valve for use with a single-acting motor which both unloads the pressure source when holding the check valve open and provides acceleration control in stopping the motor.

Further, such results have been accomplished in a low cost, unitary assembly of a pumping mechanism having the necessary valves compactly accommodated in the pump head.

While the form of embodiment of the invention as herein disclosed constitutes a preferred form, it is to be understood that other forms might be adopted, all coming within the scope of the claims which follow.

What is claimed is as follows:

1. A control system for operating a transmission having a fluid motor and a fluid pressure source, comprising: means forming a first fluid passage connectable between said fluid pressure source and said fluid motor; check valve means in said passage oriented to block flow from the motor; fluid pressure operable plunger means shiftable to open said check valve against pressure in said motor means forming a second fluid passage to conduct fluid from said source to operate said plunger; and valve means operable to vent said second passage on movement of the plunger to its check valve opening position.

2. A control system for operating a transmission having a fluid motor and a fluid pressure source, comprising: means forming a first fluid passage connectable between said fluid pressure source and said fluid motor; check valve means in said passage oriented to block flow from the motor; fluid pressure operable plunger means shiftable to open said check valve against pressure in said motor means forming a second fluid passage to conduct fluid from said source to operate said plunger; and valve means conjointly operable with said plunger to vent said second passage on movement of the plunger to its check valve opening position.

3. A control system for operating a transmission having a fluid motor and a fluid pressure source, comprising: means forming a first fluid passage connectable between said fluid pressure source and said fluid motor; check valve means in said passage oriented to block flow from the motor; fluid pressure operable plunger means shiftable to open said check valve against pressure in said motor means forming a second fluid passage to conduct fluid from said source to operate said plunger; and valve means carried by said plunger operable to vent said second passage on movement of the plunger to its check valve opening position.

4. A control system for operating a transmission having a reservoir, a fluid motor and a fluid pressure source, comprising: first fluid conduit means connected to said fluid pressure source; second fluid conduit means in communication with said reservoir; third fluid conduit means connectable to said motor; check valve means in the third fluid conduit oriented to block flow from the motor; plunger means having an area thereon exposable to fluid source to open the check valve against pressure in the motor; fourth fluid conduit means in communication with said area on the plunger; valve means having a neutral central position in which the third and fourth conduit means are in communication with both said first and second conduits, said valve means being shiftable from said central position to conjointly inversely affect the communication between the third and fourth conduits and said first and second conduits; and auxiliary valve means conjointly operable with said plunger to effect communication between said first passage and said second passage on movement of the plunger to its check valve opening position.

5. A control system for operating a transmission having a reservoir, a fluid motor and a fluid pressure source, comprising: first fluid conduit means connected to said fluid pressure source; second fluid conduit means in communication with said reservoir; third fluid conduit means connectable to said motor; check valve means in the third fluid conduit oriented to block flow from the motor; plunger means having an area thereon exposable to fluid source to open the check valve against pressure in the motor; fourth fluid conduit means in communication with said area on the plunger; valve means having a neutral central position in which the third and fourth conduit means are in communication with both said first and second conduits, said valve means being shiftable from said central position to conjointly inversely affect the communication between the third and fourth conduits and said first and second conduits; and auxiliary valve means conjointly operable with said plunger to effect communication between said first passage and said second passage, through a part of said third passage, on movement of the plunger to its check valve opening position.

6. A power transmission for operating a plurality of fluid motors from a fluid pressure source, comprising: means forming a pair of fluid passages, each connectable between the fluid pressure source and one of said motors; flow dividing valve means to proportion flow in the pair of passages by conjointly and inversely affecting resistance to flow in each of the passages, said valve means having thereon a pair of opposed areas each exposed to pressure in one of said pair of passages; check valve means in one of said pair of passages oriented to block flow from that passage's motor; plunger means having an area thereon exposable to fluid pressure to open said check valve against pressure in said motor; and means to damp movement of said flow dividing valve and said plunger means whereby acceleration forces in the system may be controlled, said means comprising a restricted fluid path to said area on said plunger and a restricted fluid path to at least one of said areas on said flow dividing valve means.

7. A power transmission for operating a pair of fluid motors from single fluid pressure source comprising: means forming a pair of fluid passages, each connectable between the fluid pressure source and one of said motors; a fixed restriction in each passage; flow dividing valve means downstream from the restrictions to maintain a predetermined relation between the pressure drops thereacross, thereby to proportion flow in the pair of passages; directional valve means in one of said pair of passages, said directional valve having a neutral position in which it vents said one passage and being shiftable to a position in which it effects connections between said source and one of said motors; and means, exclusive of said restrictions, to damp movement of said flow dividing valve, whereby momentary disproportionate flow may be induced in said pair of passages to limit acceleration of the other of said motors.

8. A power transmission for operating a pair of fluid motors from single fluid pressure source comprising: means forming a pair of fluid passages, each connectable between the fluid pressure source and one of said motors; a fixed restriction in each passage; flow dividing valve means downstream from the restrictions to maintain a predetermined relation between the pressure drops thereacross, thereby to proportion flow in the pair of passages; directional valve means in each one of said pair of passages, said directional valves having neutral positions in which they vent said passages and being shiftable to positions in which they effect connection between said source and said motors; and means, exclusive of said restrictions, to damp movement of said flow dividing valve, whereby momentary disproportionate flow may be induced in said pair of passages to limit acceleration of said motors.

9. A power transmission for operating a plurality of fluid motors from a single fluid pressure source comprising: means forming a pair of fluid passages, each connectable between the fluid pressure source and one of said motors; a fixed restriction in each passage; flow dividing valve means downstream from the restrictions and having a pair of opposed areas each exposed to pressure in one of said passages, said valve means being shiftable in response to a pressure differential in the passages to maintain a predetermined relation between the pressure drops across said restrictions thereby to proportion flow in the two passages; directional valve means in one of said pair of passages, said directional valve having a neutral position in which it vents said one passage and being shiftable to a position in which it effects connection between said source and one of said motors; and means forming a restricted fluid path from one of said passages to one of said opposed areas to damp movement of said valve means whereby momentary disproportionate flow may be induced in said pair of passages and acceleration forces in the system may be controlled.

References Cited in the file of this patent

UNITED STATES PATENTS

| | | |
|---|---|---|
| 1,999,834 | Ernst | Apr. 30, 1935 |
| 2,588,520 | Halgren et al. | Mar. 11, 1952 |
| 2,618,121 | Tucker | Nov. 18, 1952 |